Feb. 16, 1954   B. F. ROACH   2,669,299
FUEL LINE AND THE LIKE AND MEANS FOR HEATING THE SAME
Filed April 13, 1950
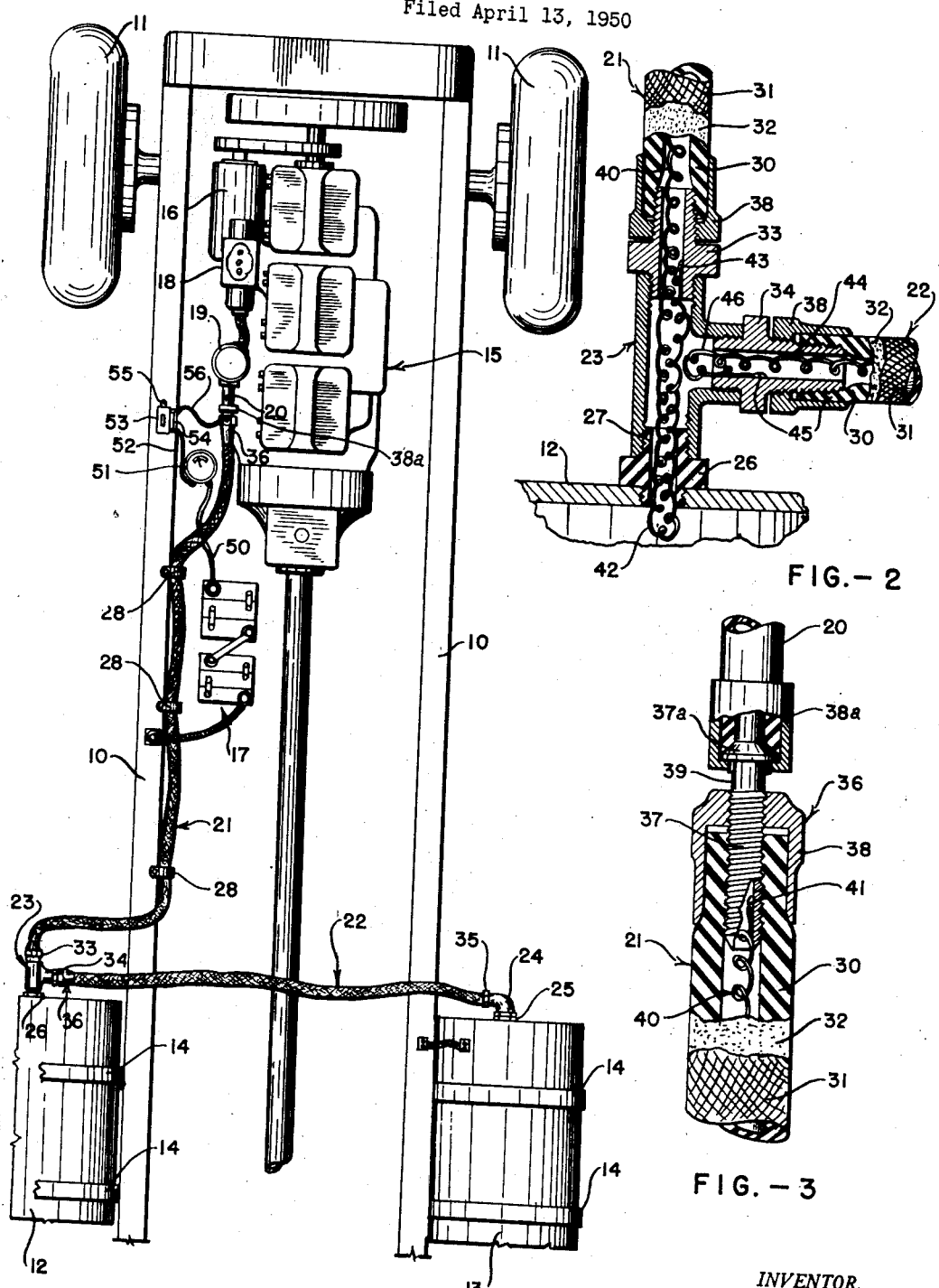
FIG.—1   FIG.—2   FIG.—3
INVENTOR.
Benjamin F. Roach
BY
ATTORNEY Patented Feb. 16, 1954

2,669,299

UNITED STATES PATENT OFFICE 2,669,299

FUEL LINE AND THE LIKE AND MEANS FOR HEATING THE SAME

Benjamin F. Roach, Denver, Colo.

Application April 13, 1950, Serial No. 155,625

3 Claims. (Cl. 158—36)

The present invention relates to liquid fuel lines and the like and to means for heating the same. It has to do particularly with an improved fuel line and improved means for heating fuel in the line for a diesel power plant or engine in a truck or tractor as it flows from the fuel supply tank, or tanks, usually located at a point remote from the engine, to said engine. The invention may, however, be equally well applied to a hydraulic system wherein it is desirable to keep the hydraulic fluid in readily flowable condition and unaffected by low degree temperatures. The instant application is a continuation-in-part of my copending application Serial Number 107,265 filed July 28, 1949 and now abandoned.

Diesel engine operated trucks, tractors and trailers experience considerable difficulty during the winter season in the colder regions or sections of the United States, Canada and other countries where temperatures fall considerably below the freezing point. This difficulty is caused by the fact that the fuel supply tank or tanks of those vehicles are located, in most instances, at a distance of from 10 to 12 feet from the diesel power unit or engine, with a major portion of the connecting fuel line exposed to the elements. Diesel fuel is a normally "heavy" fuel and drops in the temperature do not have to be very severe or acute to cause the fuel to congeal and thus fail to flow properly from the supply tank to feed the engine with the constant and proper supply of fuel necessary to keep it running in extremely cold weather.

Losses experienced through failure of diesel engines of trucks and trailers to start and/or run during cold weather have been monumental and have caused considerable consternation among operators and owners of such equipment. Attempts have been made to remedy this bad condition by heating the diesel fuel tanks in an effort to cause the fuel to flow, without congealing, to the engine. Such attempts have been largely unsuccessful for the reason that regardless of the high temperature to which the fuel is brought before it leaves the supply tank, it will encounter cold spots on its travel or passage toward the power plant or engine which will caus it to congeal, or thicken rapidly, in those portions of the conduit or pipeline which are directly exposed to the elements, thus defeating the purpose for which the fuel was heated. In fact, experience has shown that even a single cold spot in the pipeline will cause congealing of the heavy type of fuel.

One of the objects of the present invention is, therefore, to provide an improved fuel line and improved fuel-heating means associated therewith capable of overcoming the objectionable defects of fuel feed lines heretofore used in connection with diesel power plants of trucks, tractors, and the like vehicles, where the fuel lines, or parts thereof, are exposed to the elements.

Another object of the invention is to provide an improved fuel line preferably in the form of a solvent-resisting hose which is not attacked or deteriorated by the liquid fuel which passes through it and which has incorporated therein new and improved means for heating the fuel to maintain it in a freely flowable condition regardless of temperature conditions.

A further object of the present invention is to provide an improved flexible conduit for delivering fuel from the supply tank or tanks of a diesel-powered vehicle to the diesel engine thereof, wherein the conduit has a low voltage electrically heated wire coil located therein with which the fuel comes into contact to maintain the fuel in freely uowable condition under any and all extremely low temperature weather conditions.

Another object of the present invention is to provide an improved fuel line and preferably low voltage electric heating means therefor in which the electric current is derived from the storage battery or batteries of the vehicle of which the fuel line forms a part; it being a further object of the present invention to employ low amperage current, permitting the electrical heating means to be left turned on at all times, whether or not the vehicle and/or the power plant are in operation, thus maintaining the power plant in readiness for quick starting at all times and under any temperature or weather conditions.

A further object of the present invention is to provide an improved flexible fuel line or conduit of the foregoing nature in which the electrically heated wire coil is connected with a safety fuse and visible or audible signal means, preferably located in the truck cab or enclosure, functionable upon the break, overloading, or short circuiting of the wire coil which might be caused by damage to the fuel line or conduit resulting from an accident in which the vehicle becomes involved, or otherwise.

Another and important object of the present invention is to provide an improved and preferably flexible conduit or fuel line having a preferably low voltage electrically heated wire coil disposed therein, in which portions of the coil extend throughout the entire length of the fuel line between the fuel supply tank or tanks and the power plant, and in which portions of the electrically heated wire coil extend into the fuel tanks and through any couplings by which the fuel line is attached to prevent the presence of any "cold spots" at any location in the line, thereby insuring the proper raising of the temperature of the fuel within the fuel line at all times above the temperature of the air outside or surrounding the line.

Another object of the present invention is to provide an improved fuel line or conduit of the foregoing nature having metal coupling members associated therewith and having fuel heating means in the form of a low voltage electrically heated wire coil disposed within the conduit, in which portions of the coil may be looped to extend into coupling members and be soldered or otherwise electrically connected directly to those coupling members; it being another object of the present invention to provide at those portions of the fuel supply line or conduit connected respectively with the supply tank or tanks and with the diesel engine or other power plant, attaching bushings or other members formed from insulating or non-conducting material, such as plastic, or the like, whereby the entire electrically heated coil system is insulated from the supply tank or tanks and from the engine or other power plant.

The foregoing and other objects and advantages of the present invention will appear from the following description and appended claims when considered in connection with the accompanying drawing forming a part of this specification wherein like reference characters designate corresponding parts in the several views.

In said drawing:

Fig. 1 is a top plan view of a diagrammatic or schematic nature illustrating one application of the present invention in connection with the frame, power plant, and fuel supply tanks of a diesel engine powered truck, tractor, or similar vehicle.

Fig. 2 is an enlarged fragmentary and considerably more detailed view, partly in section and partly broken away, of a portion of the heated fuel line or system of the present invention shown in association with one of the fuel supply tanks; and Fig. 3 is a fragmentary elevational view, partly in section and partly broken away, of suitable coupling means for attaching the heated fuel line of the present invention to an appropriate part or unit of the power plant.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

With particular reference to the drawing, and especially to Fig. 1 thereof, there is shown in that figure a truck or tractor having a frame or chassis 10, front wheels 11, 11, and having two separate but interconnected fuel supply tanks 12 and 13 which are mounted outside or externally of the parallel longitudinal members of frame or chassis 10, being connected to said chassis by clamping band-like members or straps 14. These tanks may, however, be mounted in any other manner and at any other desirable location. Usually, they are mounted outside the longitudinal frame members below and behind the cab of the truck and are thus not only fully exposed to prevailing temperatures but to the elements as well. In the average diesel-powered truck or tractor, the fuel tanks 12 and 13 will be located from 10 to 12 feet from the power plant or diesel engine, shown as a whole at 15. The power plant, as shown diagrammatically, includes the usual operative units of such a power plant, namely such units as a generator 16 for keeping storage battery or batteries 17 fully charged, a fuel pump 18 and a fuel filter 19.

The improved fuel supply line or flexible conduit, with its contained electrically heated wire coil is shown as a whole in two sections 21 and 22. Section 21 is connected with the fuel filter 19 and fuel pump 18 through the medium of an insulating, preferably plastic bushing 20 at its opposite end to fuel supply tank 12, through the medium of a T-coupling or fitting 23. The other section 22 of the fuel line is connected at one end with T-coupling 23 and at its opposite end, through the medium of an L-coupling or fitting 24 and a metal bushing or attaching member 25, with fuel supply tank 13. It is to be noted, see particularly Figs. 1 and 2, that T-coupling or connection 23 is threadedly connected with an insulating, preferably plastic threaded bushing 26, similar to bushing 25 associated with tank 13. It is to be seen in Fig. 2 that the insulating bushing 26 is threaded directly into the lower forward portion of the fuel supply tank 12 and is externally threaded at its forward reduced portion 27 to receive the internal threads of T-coupling or fitting 23. Thus, the fuel line sections 21 and 22 and the fittings 23 and 24 are insulated from the fuel tanks 12 and 13, the forward end or fuel line section or portion 21 being also insulated from the fuel filter 19 by the insulating bushing 20, as stated above. To prevent the flexible conduit or hose for the fuel from too much play or freedom of movement, suitable clamping means or brackets 28 are provided for removably mounting it upon a portion of the chassis or vehicle frame 10.

As best seen in Figs. 2 and 3, the flexible conduit or hose is preferably in the form of solvent-resisting hose having a body portion 30 with an exterior loom woven covering 31 and an intermediate layer or covering of asbestos 32.

As best seen in Fig. 2, the flexible hose or conduit portion 21 is engaged with the external threads of a preferably metal connector 33, which connector is threadedly engaged with the T-coupling member 23. The conduit section 22 is similarly connected to the T-coupling 23 by means of a similar preferably metal connector 34. The opposite end of hose section 22 is attached to a connector 35, which latter is threadedly engaged with L-coupling member 24.

The forward end of hose section 21 is connected with an adjustable standard coupling member, shown as a whole at 36, see particularly Fig. 3. The forward end of the hose section 21 is forced over the threaded shank 37 of the coupling member and the sleeve-like cap 38 is tightened down to compress the end portion of the hose between the parts and draw the parts together. The outer end of the threaded stem 37 carries a sleeve-like member 38a which is held in place upon the stem by the head portion 37a of said stem. Sleeve 38a is preferably forced over the plastic bushing member 20, as clearly seen in Fig. 3, said bushing member 20 being suitably mounted upon or connected with the fuel filter 19, the details of said connection with the fuel filter not being shown. Shank 37 is provided with a non-round portion 39 to which a wrench may be applied to adjust the parts. Generally similar connections may be provided between the opposite end of conduit section 21 and T-fitting 23 and between T-fitting 23 and the adjacent end portion of hose section 22.

As stated above, it is particularly desirable to maintain a diesel-powered vehicle in readiness to start at all times and under all atmospheric and temperature conditions. In view of the fact that the fuel oil for diesel engines is heavy-bodied and congeals rather freely when subjected to cold temperatures, it is particularly desirable to heat this fuel and maintain it in heated condition during its passage through the approximately 10 to 12 foot long pipeline or conduit which connects the fuel tank or tanks of a diesel-powered truck with the diesel engine thereof.

In accordance with the present invention a preferably low voltage electrically heated wire coil or system, which derives its source of heating current from the preferably similar pair of storage batteries 17, is arranged within the two sections or portions 21 and 22 of the flexible solvent hose of the present invention, with portions of the coil extending preferably throughout the entire length of the hose from fuel tank 13 to fuel tank 12 and thence from fuel tank 12 to insulator 20 attached to the fuel filter 19. It is particularly important that no gaps in the heating means occur, particularly in those portions of the fuel line or hose which are directly exposed to the elements and temperature conditions. The heating coil or resistance wire or wires of the present invention are preferably formed from some suitable alloy and also preferably formed in sections and looped portions so that all parts or areas of the fuel supply line and the coupling members for attaching it are subjected to heat from the wire coil or coils. The wire heating coil is designated as a whole at 40, see Figs. 2 and 3 and preferably extends continuously from the point where it is soldered or otherwise connected at 41 (Fig. 3) onto the threaded stem 37 of coupling or fitting 36, through conduit section or length 21, through connector 33 and having its end loop 42 extending into and through T-coupling 23, into tank 12, with the end of loop 42 of wire 40 being soldered or otherwise attached at 43 to connector 33, see Fig. 2. The second or shorter section or length 22 of the hose or conduit carries a similar wire heating coil 44, see Fig. 2, which is soldered or otherwise connected at one end at 45 to connector 34. The adjacent end portion of wire coil 44 is looped at 46 and extends, as shown, into T-coupling 23. The wire coil 44 then extends throughout the length of conduit section 22 and projects, preferably in the form of a loop similar to loop 46, into the L-coupling or connection 24 (Fig. 1) this looped end of wire 44 not being shown but being preferably connected, as by means of solder, to fitting or coupling 24 to complete the electrical circuit. Although it is not shown in the drawing, another looped end 46 of the wire coil is extended through metal fitting 24 and preferably through the insulating bushing 25 and into the interior of fuel tank 13, the looped portion of the coil preferably extending approximately ¾ of an inch into said tank. This looped portion is generally similar to looped portion 42 of the wire coil (Fig. 2) and its free or terminal end is soldered or otherwise connected to T-coupling 23, to complete the course or circuit. Thus it will be seen, that by virtue of the wire coil sections or lengths 40 and 44 and their looped ends as shown and described, the entire length of the two sections 21 and 22 of solvent hose are traversed by the heated wire coils. Moreover, it will be seen that the T-coupling 23 and the L-coupling or elbow have looped coil portions extending into them to heat any fuel in said couplings, while at the same time looped portions of the wire coil, such as the looped portion 42 seen in Fig. 2, project or are extended into both fuel tanks 12 and 13.

As stated above, the source of current for heating the wire coil sections 40 and 44 is the storage battery or batteries 17. A suitable wire or conduit 50 is attached to battery 17 and extends to an ammeter 51. Said ammeter is electrically connected by a wire 52 to a safety device or unit which combines, preferably, a tumbler type switch 53, a preferably three ampere fuse 54 and a pilot signal light 55, this unit being electrically connected through a positive wire connection 56 to coupling 36. Thus the electrical power, preferably not exceeding twelve volts and not consuming more than five or six amperes is supplied by battery 17 to the heating wire coil system whenever switch 53 is closed. Thus the entire length of the wire coil will be energized and since the various portions of the coil are preferably submerged in the fuel which flows from the supply tanks to the diesel engine, this fuel is maintained in heated condition, always above ambient temperature, throughout its entire body between the tanks and the engine.

The fuel conduit or supply line may be formed from any suitable flexible hose but is preferably solvent hose which is not attacked or affected in any way by diesel fuel. The wire coil may also be formed from any desired and suitable metal and the size or gauge of wire employed is determined by the amount of amperage in the heat generated.

The particular looped arrangement and the particular points at which the coiled wire is electrically connected to the couplings, etc., are merely illustrative. Other arrangements may be employed within the scope of the present invention. Moreover, various other types of connectors or coupling members may be employed to properly mount and connect the fuel line to the supply tanks and to the power plant, the particular devices shown in the drawing having been disclosed merely by way of example.

While a so-called safety device constituting the switch 53, fuse 54 and signal means 55 has been described and shown in the drawing, which safety device is preferably intended to be mounted at any suitable location within the cab, such as upon the instrument panel, this has been included merely to satisfy the requirements of fire underwriters, et al. Actually, a break in the fuel line and/or a break in the electrically heated wire coil will cause absolutely no danger from the standpoint of fire, for the reason that the wire coil is heated by means of a low voltage current derived from the storage battery or batteries.

One of the important features of the present invention lies in the fact that the electric current used is of extremely low amperage. Thus the current may be allowed to flow at all times to the heating coils or wires, even when the heat derived from those coils is not needed, without causing any undue drain on the battery or batteries of the vehicle.

The present invention, while described above and illustrated in the drawing for use in connection with diesel powered vehicles, is capable of being adapted for use in preventing the congealing of various kinds of liquids passing through pipe lines or conduits which are exposed to low temperatures. The invention is also well adapted for heating the fluid in hydraulic systems of various kinds, especially where the hydraulic fluid would be exposed to low temperatures.

The coupling or fitting parts 38 of both Figs. 2 and 3 may be alike, or generally similar, as shown. Their function is, however, generally the same, namely to crowd or compress the flexible hose section end portions between the inner or male members or threaded stems of portions 33, 34 and 37 and the outer or female members or sleeves 38.

I claim:

1. For use with a self-propelled vehicle the combination of a diesel power unit, a fuel supply tank remote therefrom, and a fuel supply line comprising: fuel conduit means of heat-insulating dielectric material extending between and connecting the tank and power unit for supplying fuel to the latter, said conduit means being exposed to atmospheric temperature throughout a major portion of its length; a low voltage electric wire heating element disposed within the interior of said conduit means and extending throughout the length of the latter; and means connected to said heating element for supplying electric power thereto for raising the temperature of fuel within said conduit sufficiently to enable free flow thereof.

2. The combination defined in claim 1 including a loop of the wire heating element extending into the fuel supply tank for heating fuel therein adjacent the fuel conduit means connection thereto.

3. The combination defined in claim 1 including: a second fuel supply tank remote from the power unit and a metallic T fitting having one branch thereof connected to the second tank and electrically insulated therefrom with the two other branches of said fitting being connected into the fuel conduit means for also supplying fuel to the power unit from the second tank, the electrical continuity of the heating element being continuous through said fitting.

BENJAMIN F. ROACH.

References Cited in the file of this patent

UNITED STATES PATENTS

| Number | Name | Date |
| --- | --- | --- |
| 1,125,549 | Jay | Jan. 19, 1915 |
| 1,905,343 | Carpenter | Apr. 25, 1933 |
| 2,346,506 | Pulliam | Apr. 11, 1944 |
| 2,377,899 | Pitre et al. | June 12, 1945 |
| 2,433,374 | Kruschke | Dec. 30, 1947 |

FOREIGN PATENTS

| Number | Country | Date |
| --- | --- | --- |
| 323,906 | Germany | Feb. 19, 1918 |